United States Patent [19]

Gruber et al.

[11] Patent Number: 5,673,590

[45] Date of Patent: Oct. 7, 1997

[54] DRIVE DEVICE FOR A MOVABLE PART OF A MOTOR VEHICLE

[75] Inventors: Reinhold Gruber, Dietringen; Claus Vordermaier, München; Andreas Schmidt, Gauting, all of Germany

[73] Assignee: Webasto Karosseriesysteme GmbH, Stockdorf, Germany

[21] Appl. No.: 585,517

[22] Filed: Jan. 16, 1996

Related U.S. Application Data

[63] Continuation of PCT/EP94/02359 Jul. 18, 1994.

[30] Foreign Application Priority Data

Jul. 16, 1993 [DE] Germany .......................... 43 23 945.5

[51] Int. Cl.$^6$ .......................... B60J 7/04; E05F 15/10; F16H 1/16

[52] U.S. Cl. .......................... 74/89.14; 74/425; 296/223; 475/162

[58] Field of Search .......................... 74/89.14, 425; 475/162; 403/4; 296/223

[56] References Cited

U.S. PATENT DOCUMENTS

| | | | |
|---|---|---|---|
| 1,720,422 | 7/1929 | Manville | 403/4 |
| 2,713,971 | 7/1955 | Bud et al. | 475/162 |
| 3,500,976 | 3/1970 | Halley | 403/4 |
| 4,561,691 | 12/1985 | Kawai et al. | 296/223 X |
| 4,659,141 | 4/1987 | Masuda et al. | 296/223 |
| 5,181,891 | 1/1993 | Pohl et al. | 475/162 |

FOREIGN PATENT DOCUMENTS

| | | | |
|---|---|---|---|
| 2424042 | 1/1972 | Germany | 475/162 |
| 4021973 | 1/1992 | Germany | 74/89.14 |
| 9116261 | 11/1992 | Germany | |
| 5-26301 | 2/1993 | Japan | 475/162 |

*Primary Examiner*—Charles A. Marmor
*Assistant Examiner*—Troy Grabow
*Attorney, Agent, or Firm*—Sixbey, Friedman, Leedom & Ferguson, P.C.; David S. Safran

[57] ABSTRACT

A drive device for a part of a motor vehicle which can be moved between end positions, especially for a movable cover of a vehicle roof, with an electric motor which is joined via a reducing gear to a driving pinion which sits on a driven shaft that is drive-connected to the movable part, and with a switching means which controls the motor for shutting off the motor in at least one predetermined position of the movable part which is actuated by a ratchet wheel which is caused to rotate less than 360° via an eccentric toothed gearing when the part is moved between its end positions, the eccentric toothed gearing having an external body gear wheel with internal gear teeth arranged coaxial to a shaft of the eccentric toothed gearing, and an externally toothed internal body gear wheel which meshes therewith and which has at least one tooth less than the external gear wheel and which is supported on an eccentric of the eccentric toothed gearing that is rotationally fixed to the shaft so as to be able to rotate relative to the internal gear wheel and the eccentric. The external gear wheel is rotationally fixed to the ratchet wheel, and the internal body gear wheel is prevented from rotating relative to the external body gear wheel by a stationary guide pin which is received in one of a plurality of recesses provided in the internal body gear wheel for that purpose.

14 Claims, 6 Drawing Sheets

FIG. 1
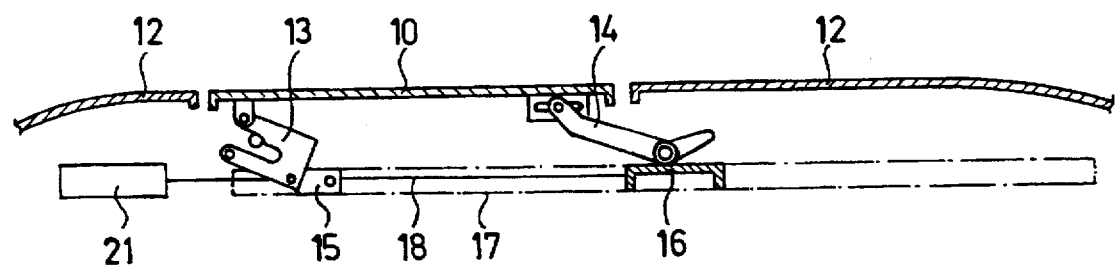
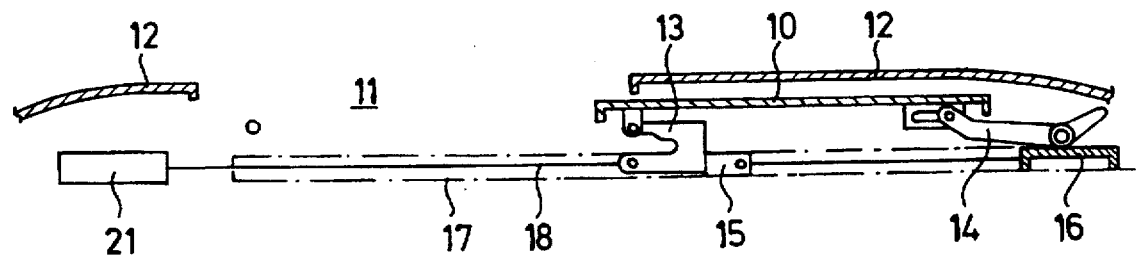
FIG. 2

DRIVE DEVICE FOR A MOVABLE PART OF A MOTOR VEHICLE

BACKGROUND OF THE INVENTION

Cross-reference to Related Application

This application is a continuation of International Application No. PCT/EP94/02359 filed Jul. 18, 1994, designating the United States.

1. Field of the Invention

The invention relates to a drive device for a part of a motor vehicle which can be moved between end positions, especially for a movable cover of a vehicle roof, with an electric motor which is joined via a reducing gear to a driving pinion which sits on a driven shaft that is drive-connected to the movable part, and with a switching means which controls the motor for shutting off the motor in at least one predetermined position of the movable part which is actuated by a ratchet wheel which is caused to rotate less than 360° via an eccentric toothed gearing when the part is moved between its end positions, the eccentric toothed gearing having an external body gear wheel with internal gear teeth arranged coaxial to a shaft of the eccentric toothed gearing, and an externally toothed internal gear wheel which meshes therewith and which has at least one tooth less than the external body gear wheel and which is supported on an eccentric that is rotationally fixed to the shaft so as to be able to rotate relative to the internal gear wheel and eccentric, the internal gear wheel being prevented by means of a stationary guide pin from rotating relative to the external body gear wheel and the external body gear wheel being rotationally fixed to the ratchet wheel

2. Description of Related Art

In a known drive device of the above-mentioned type (U.S. Pat. No. 5,181,891), an internal gear having an internal body with external gear teeth is located on an eccentric disk and is provided, at a predetermined site, with a radial recess which is formed either radially inwardly of the teeth of the internal gear or in a part of the internal gear which projects radially outward beyond these teeth. A guide pin is movably guided within the radial recess. When the known drive device is installed, the internal gear wheel must be brought exactly into a rotary position such that the guide pin is aligned with the radial recess of the internal gear wheel before the internal gear wheel can be moved in an axial direction relative to the guide pin for engaging the guide pin in the radial recess.

SUMMARY OF THE INVENTION

The object of the present invention is to devise a drive device of the type mentioned initially which allows for a more simplified installation.

This object is achieved in accordance with the present invention by providing a drive device of the type mentioned initially with an internal gear wheel having a plurality of recesses which correspond in number to the number of teeth of the internal gear wheel, any one of which can be selectively engaged by the guide pin. In this way, the drive device according to the present invention can be assembled in a number of mutual angular positions of the guide pin and internal gear wheel which corresponds to the number of external teeth of the internal gear wheel, instead of in only one. This results in considerable simplification of the installation process.

In accordance with one embodiment of the invention, the recesses which are intended for interacting with the stationary guide pin are formed by the gaps between the teeth of the internal gear wheel. This eliminates the need to provide the internal gear wheel with additional recesses, i.e., even the one radial recess previously provided can be eliminated. The internal gear wheel consequently acquires an especially simple form. Moreover, this embodiment ensures that meshing between the guide pin and the internal gear wheel is exactly in the area of the internal gear wheel teeth. This results in the fact that the external gear wheel, and thus also the ratchet wheel, periodically stop depending on the wobbling of the internal gear wheel. This movement characteristic provides an especially reliable response of the switching means actuated by the ratchet wheel, even at high switching speeds or in very sluggish switching systems.

In a modified embodiment of the invention, the internal gear wheel is provided with a series of additional recesses, the mutual angular distance of which matches that of the teeth of the internal gear wheel. These recesses are formed, preferably, as radially aligned longitudinal slots which are circumferentially aligned with the tips of the teeth of the internal gear wheel.

A gear which is drive-connected to the driven side of the reducing gear can be advantageously rotationally fixed to the shaft of the eccentric toothed gearing, this gear preferably being mounted to be axially adjustable on the shaft of the eccentric toothed gearing and being elastically supported in one axial direction in order to provide exact positioning of the gear within the housing of the drive device. In this case, in another advantageous embodiment of the invention, the gear carries at least two spring arms which lie radially on opposite sides of the shaft of the eccentric toothed gearing, which are formed preferably simply by appropriate punching out of the gear, and which are supported on a stationary guideway, for example, an annular crosspiece on a housing of the drive device.

These and further objects, features and advantages of the present invention will become apparent from the following description when taken in connection with the accompanying drawings which, for purposes of illustration only, show several embodiments in accordance with the present invention.

BRIEF DESCRIPTION OF THE DRAWINGS

FIG. 1 is a schematic longitudinal section of a sliding vehicle roof with a movable cover thereof in a closed position;

FIG. 2 is a sectional view corresponding to FIG. 1 but with the cover moved into a fully open position;

DETAILED DESCRIPTION OF THE PREFERRED EMBODIMENTS

Figure 3:
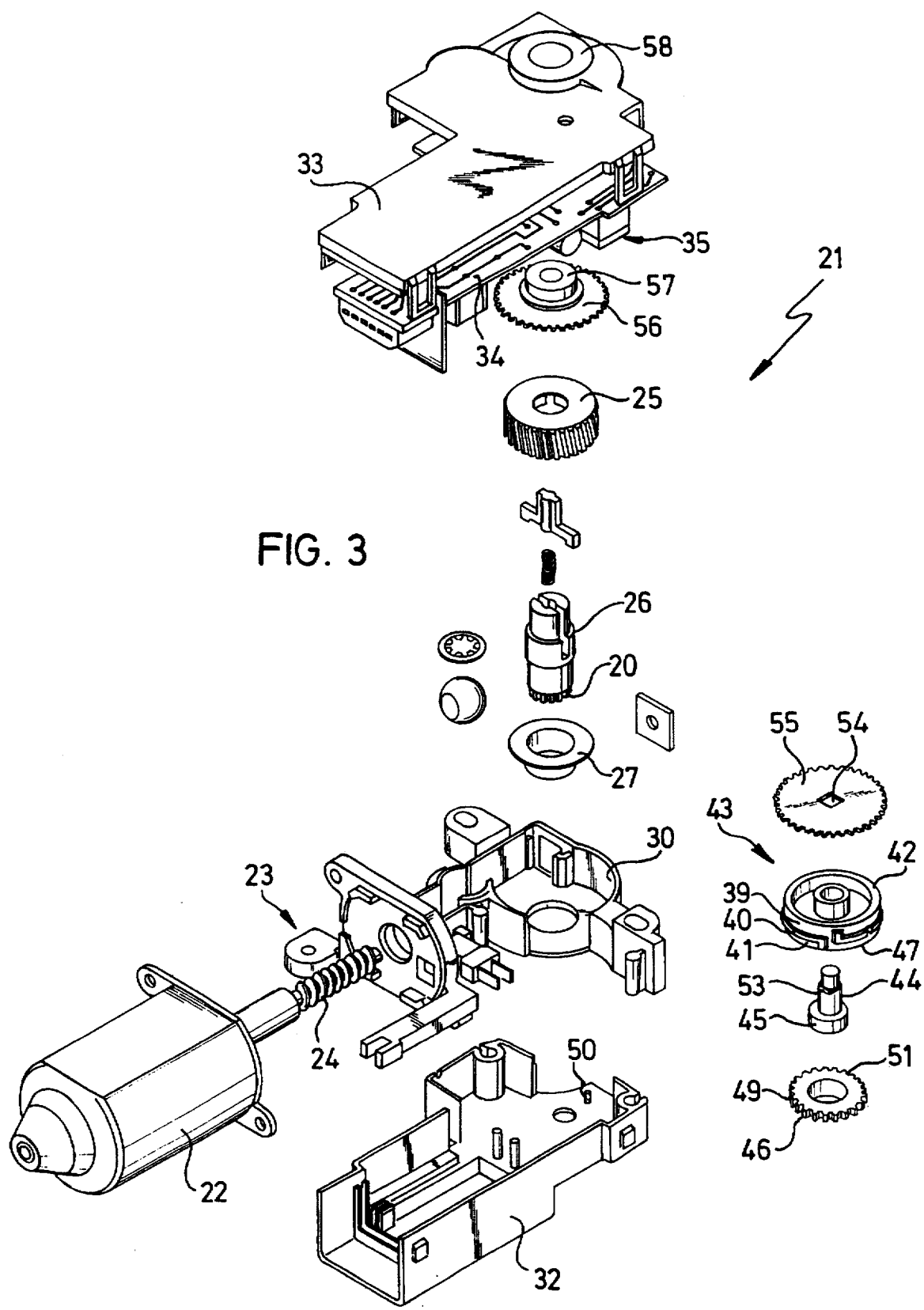
FIG. 3 shows an exploded view of the drive device of the vehicle roof according to FIGS. 1 and 2.

The sliding vehicle roof shown in FIGS. 1 and 2 has a cover 10 which closes a roof opening 11 which is formed in a fixed roof surface 12 in a closed position thereof (FIG. 1). Each side of the cover 10 is supported on a respective front cover support 13 and on a rear cover support 14. Cover supports 13 and 14 are connected, respectively, to a front slide 15 and a rear slide 16, both of which are movably guided in the longitudinal direction of the vehicle along a longitudinal guide track 17 that is attached to the fixed roof at each side of the roof opening. In this case, a respective drive cable 18, preferably a threaded cable, acts on each of the right and left rear slides 16. The drive cables 18 interact with a drive pinion 20 (FIG. 3) of a drive device labelled 21 as a whole.

Driving pinion 20 is driven by an electric motor 22 via a reducing gear 23. Reducing gear 23 includes a worm shaft 24, preferably driven directly by motor 22, and a worm wheel 25 which meshes with the worm shaft 24. Worm wheel 25 is rotationally fixed, in the embodiment shown, with respect to shaft 26 which, at the same time, is rotationally fixed relative to the driving pinion 20, and thus, forms the driven shaft of drive device 21. The shaft 26 is supported, via a bearing bush 27, in a housing formed by a transmission case 30 which is itself enclosed by an electric housing having a lower part 32 and a cover 33. The electric housing contains board 34, made as a printed circuit board, which carries a switching means 35. Switching means 35 is located in the power supply circuit of electric motor 22. The supply circuit is not shown, but is designed in a conventional manner and can, for example, have three switches, one on top of another, with actuating members which interact, one at a time, with one out of three cam paths 39, 40 or 41 that are axially offset with respect to each other on the periphery of the ratchet wheel 42. Ratchet wheel 42 is a cam wheel which serves to automatically stop cover 10 when it reaches predefined positions, for example, one or the other of opposite end positions corresponding to the closed and open positions of FIGS. 1 and 2.

In a transition of cover 10 from one end position into the other end position, worm wheel 25 executes several revolutions. The given rotary position of worm wheel 25 is, therefore, unsuited for unambiguous detection of the position of cover 10. In order to precisely determine the cover position, an eccentric toothed gearing labelled 43 overall is provided between the worm wheel 25 or shaft 26 and the ratchet wheel 42, and is designed such that the ratchet wheel 42 rotates less than 360° as the cover 10 moves from one end position into the other end position.

Figure 5:
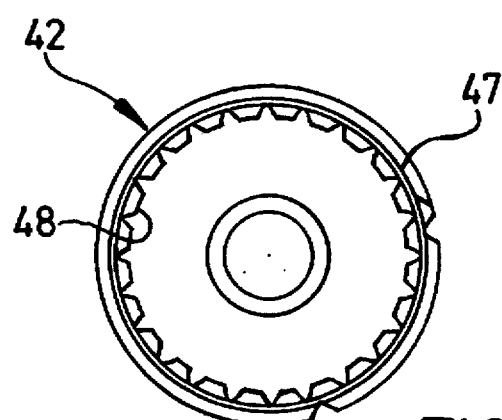
FIG. 5 is a plan view of the face of a ratchet wheel of the drive device which cannot be seen in FIG. 3.

Eccentric toothed gearing 43 includes a shaft 44, an eccentric 45, an internal body, external gearing, gear wheel 46 and external body, internal gearing, gear wheel 47. Eccentric 45 and shaft 44 are rotationally fixed with respect to each other. In the embodiment shown, the eccentric 45 is molded on shaft 44. Annular internal gear wheel 46 is rotatably carried on the cam 45. External body, internal gearing, gear wheel 47 is rotationally fixed relative to the ratchet wheel 42. In the embodiment shown, gear wheel 47 forms an integral part of the ratchet wheel 42. The ratchet/gear wheel 42/47 is rotatably carried on the shaft 44 and is provided with internal teeth 48 (FIG. 5) coaxial to shaft 44. The gear wheel 46 has external teeth 49 which mesh with internal teeth 48 and are smaller in number than the internal teeth 48 of the gear wheel 47 by at least one, and preferably, by exactly one.

A guide pin 50 projects from the inside of housing lower part 32 parallel to shaft 44 and toward toothed gearing 43. Guide pin 50 projects into one of gaps 51 between the teeth 49 of internal gear wheel 46. In this way, the gear wheel 46 is prevented from rotating relative to the gear wheel 47.

However, it can execute a back and forth motion along an axis which, for example, intersects the axis of shaft 44 at a right angle.

On shaft 44, a square formation 53 is molded which engages in a square recess 54 of gear 55 which is slipped onto shaft 44, and thus, provides a rotationally fixed connection between the shaft 44 and the gear 55.

Gear 55 meshes with gear 56 which is rotationally fixed to rotate with shaft 26, and is provided with an annular projection 57 which is rotationally supported in a bearing bush 58 of cover 33.

Figure 4:
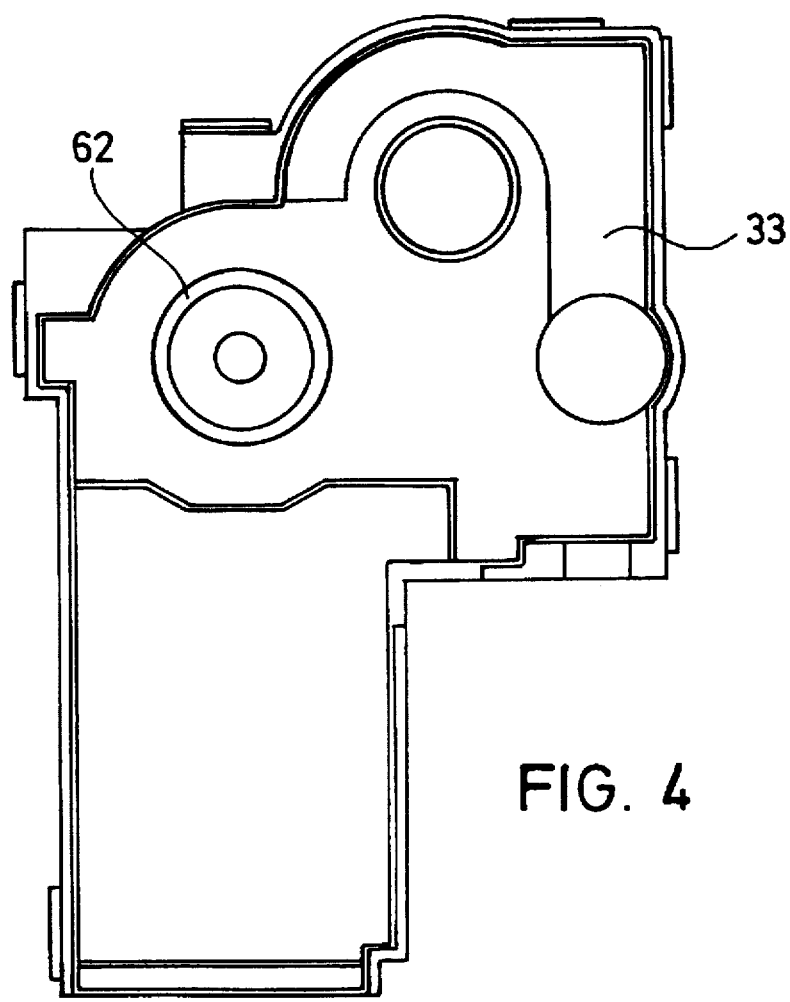
FIG. 4 shows a plan view of the inside of the housing cover of the drive device according to FIG. 3.
Figure 7:
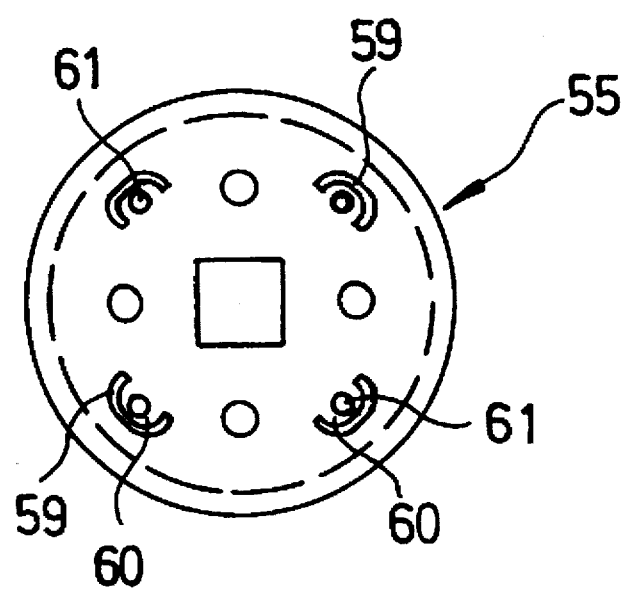
FIG. 7 shows on a larger scale, a plan view of a gear which is rotationally fixed on the shaft of the eccentric toothed gearing and is drive-connected to the driven side of the reducing gear.
Figure 8:
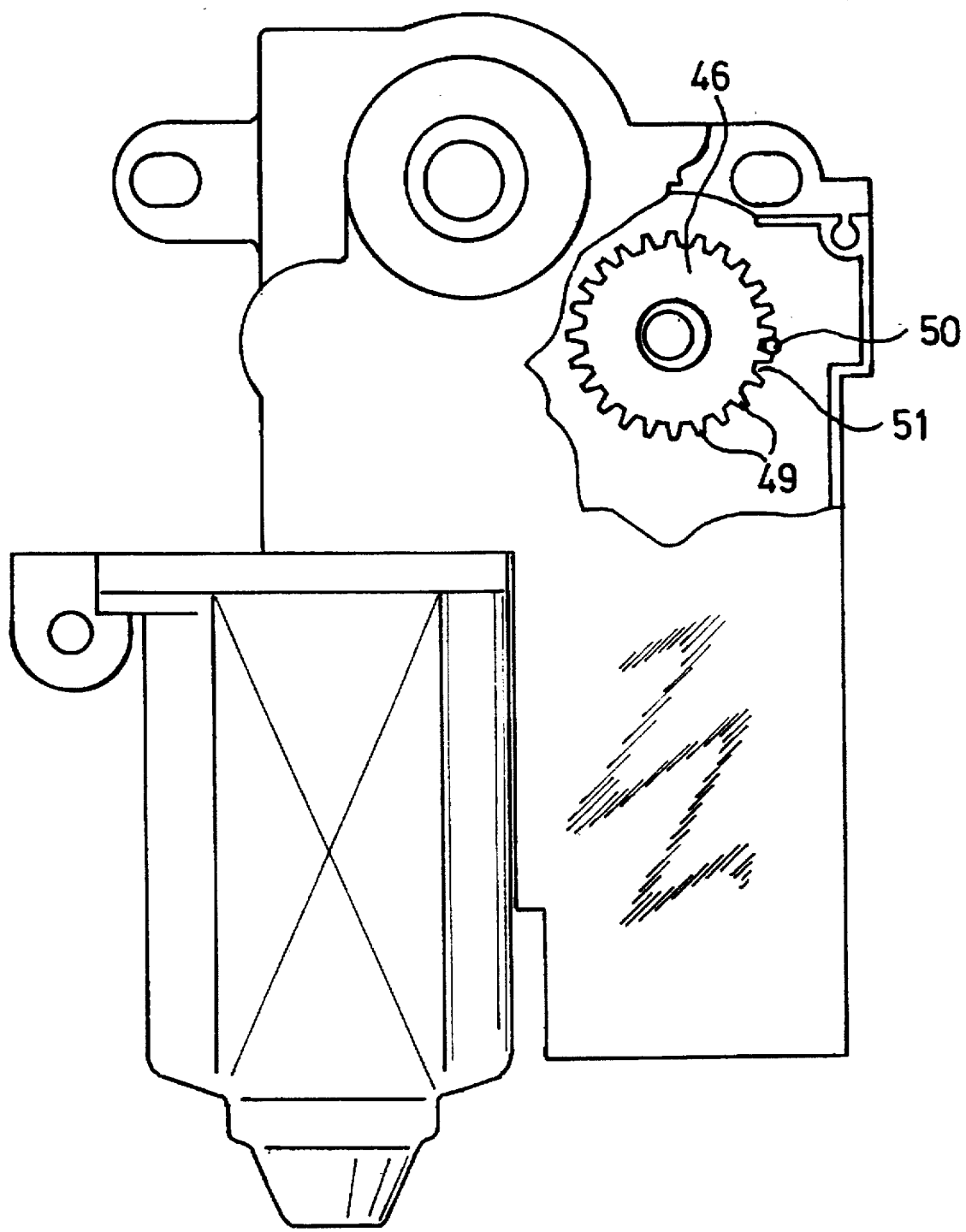
FIG. 8 is a schematic plan view of the drive device of FIG. 3.

Gear 55 is, as shown in FIG. 7, provided with four semi-annular punchouts 59, each of which is offset by 90° from the punchout 59 to either side. Recesses 59 form spring arms which are punched out of the material of gear 55 and each of which carries a cam pin 61 on its side that faces cover 33. Cam pins 61 resiliently support gear 55 in an axial direction on an annular guideway 62 which is formed as a projection extending from the underside of cover 33 (FIG. 4).

If in the course of operation, motor 22 is turned on, and in this way, the eccentric 45 is caused to rotate around the axis of shaft 44, causing the gear wheel 46 to execute a back-and-forth motion with respect to the guide pin 50, as it wobbles around the guide pin 50. In this way, the internal teeth of the gear wheel 47 joined with ratchet wheel 42 are caused to rotate around shaft 44 at a speed which is stepped down relative to the rotary motion of driving pinion 20, and in a ratio which depends on the number of teeth of gearing 48 and 49 of internal body gear wheel 46 and external body gear wheel 47, and on the gear ratio of gears 55 and 56. The switches of switching means 35, which are formed preferably as microswitches, are actuated especially reliably and quietly via cam paths 39, 40, and 41 of ratchet wheel 42.

Figure 6:
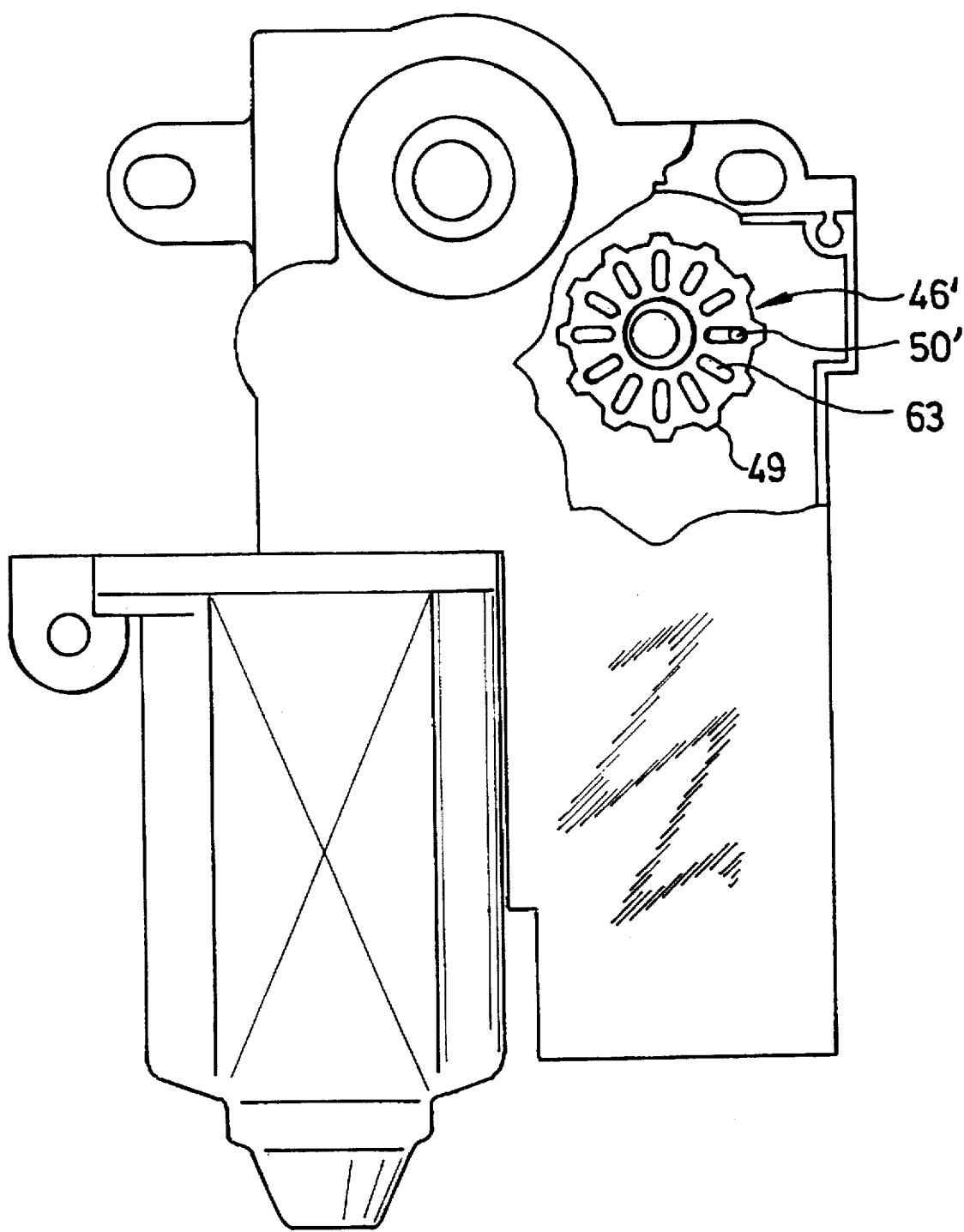
FIG. 6 shows a schematic plan view of a drive device according to a modified embodiment of the invention.

In the modified embodiment according to FIG. 6, the internal body gear wheel 46' is provided with a sequence of additional recesses which have a circumferential spacing that is matched with that of the external teeth 49 of gear wheel 46', and which are formed as radially oriented longitudinal holes 63 which are circumferentially aligned with the tips of the teeth of gear wheel 46'. Guide pin 50' attached to the housing 32 engages one of the longitudinal holes 63, which of longitudinal holes 63 guide pin 50' that is engaged being irrelevant in the assembly of the drive device.

Otherwise, the structure and manner of operation of the drive device according to FIG. 6 are analogous to those of the embodiment described above.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. A drive device for a part of a motor vehicle which is movable between end positions, comprising an electric motor which is joined via a reducing gear to a driving pinion which sits on a driven shaft and which forms part of a means for producing driving connection with a movable vehicle part, and a switching means for controlling the motor for shutting off the motor in at least one predetermined position of the movable part, a ratchet wheel rotationally driven by an eccentric toothed gearing less than 360° for actuating the switching means when the part is moved between said end positions, the eccentric toothed gearing having an external body gear wheel with internal teeth arranged coaxial to a shaft of the eccentric toothed gearing that has an eccentric rotationally fixed thereto, said external body gear wheel being rotationally fixed with respect to the ratchet, an externally toothed internal body gear wheel which meshes with the internal teeth of the external body gear wheel and which has at least one tooth less than the internal teeth of the external body gear wheel, said internal body gear wheel being supported on the eccentric joined in a manner enabling relative rotary motion between the internal body gear wheel and eccentric, and a stationary guide pin for preventing the internal body gear wheel from rotating; wherein the internal body gear wheel is provided with a number of recesses which correspond in number to the external teeth of the internal body gear wheel; and wherein the guide pin is selectively engaged with one of said recesses, it being irrelevant to operation of the drive device which recess is selectively engaged; and wherein the recesses are formed by gaps between the external teeth of the internal body gear wheel.

2. Drive device according to claim 1, wherein the guide pin is attached to the housing part of the drive device.

3. Drive device according to claim 1, wherein the external body gear wheel is an integral part of the ratchet wheel.

4. Drive device according to claim 1, wherein the reducing gear has a worm shaft driven by the motor and a worm wheel which is meshed with the worm shaft.

5. Drive device according to claim 4, wherein a coupling gear rotationally fixed to the shaft of the eccentric toothed gearing is drive-connected to a driven side of the reducing gear.

6. Drive device according to claim 1, wherein the ratchet wheel is a cam wheel.

7. A drive device for a part of a motor vehicle which is movable between end positions, comprising an electric motor which is joined via a reducing gear to a driving pinion which sits on a driven shaft and which forms part of a means for producing driving connection with a movable vehicle part, and a switching means for controlling the motor for shutting off the motor in at least one predetermined position of the movable part, a ratchet wheel rotationally driven by an eccentric toothed gearing less than 360° for actuating the switching means when the part is moved between said end positions, the eccentric toothed gearing having an external body gear wheel with internal teeth arranged coaxial to a shaft of the eccentric toothed gearing that has an eccentric rotationally fixed thereto, said external body gear wheel being rotationally fixed with respect to the ratchet, an externally toothed internal body gear wheel which meshes with the internal teeth of the external body gear wheel and which has at least one tooth less than the internal teeth of the external body gear wheel, said internal body gear wheel being supported on the eccentric joined in a manner enabling relative rotary motion between the internal body gear wheel and eccentric, and a stationary guide pin for preventing the internal body gear wheel from rotating; wherein the internal body gear wheel is provided with a number of recesses which correspond in number to the external teeth of the internal body gear wheel; and wherein the guide pin is selectively engaged with one of said recesses, it being irrelevant to operation of the drive device which recess is selectively engaged; wherein the reducing gear has a worm shaft driven by the motor and a worm wheel which is meshed with the worm shaft; wherein a coupling gear rotationally fixed to the shaft of the eccentric toothed gearing is drive-connected to a driven side of the reducing gear; and wherein the coupling gear is resiliently supported on the eccentric toothed gearing in an axially displaceable manner.

8. Drive device according to claim 7, wherein the recesses of the internal body gear wheel have a circumferential angular spacing which is the same as a circumferential angular spacing between the external teeth of the internal body gear wheel.

9. Drive device according to claim 8, wherein said recesses are formed as radially oriented longitudinal holes.

10. Drive device according to claim 9, wherein longitudinal holes are circumferentially aligned with tips of the teeth of internal body gear wheel.

11. Drive device according to claim 7, wherein the coupling gear carries at least two spring arms which lie on radially opposite sides of the shaft of the eccentric toothed gearing and which are supported on a stationary guideway.

12. Drive device according to claim 11, wherein the spring arms are punched out tabs of an inner web of the coupling gear which lie between the shaft of the eccentric toothed gearing and external teeth of the coupling gear.

13. Drive device according to claim 12, wherein the stationary guideway is annular and is attached to a housing part of the drive device.

14. Drive device according to claim 11, wherein the stationary guideway is annular and is attached to a housing part of the drive device.

* * * * *